US010266430B2

(12) United States Patent
Yin et al.

(10) Patent No.: US 10,266,430 B2
(45) Date of Patent: Apr. 23, 2019

(54) PROCESS AND SYSTEM FOR REMOVING AMMONIUM FROM WASTEWATER

(71) Applicant: Saltworks Technologies Inc., Richmond (CA)

(72) Inventors: Xiangchun Yin, Richmond (CA); Benjamin Sparrow, Richmond (CA)

(73) Assignee: Saltworks Technologies Inc., Richmond, British Columbia (CA)

( * ) Notice: Subject to any disclaimer, the term of this patent is extended or adjusted under 35 U.S.C. 154(b) by 0 days.

(21) Appl. No.: 15/578,563

(22) PCT Filed: Jun. 14, 2016

(86) PCT No.: PCT/CA2016/050686
§ 371 (c)(1),
(2) Date: Nov. 30, 2017

(87) PCT Pub. No.: WO2016/201563
PCT Pub. Date: Dec. 22, 2016

(65) Prior Publication Data
US 2018/0170775 A1     Jun. 21, 2018

Related U.S. Application Data

(60) Provisional application No. 62/175,637, filed on Jun. 15, 2015.

(51) Int. Cl.
*B01D 61/44* (2006.01)
*C02F 1/469* (2006.01)
(Continued)

(52) U.S. Cl.
CPC ............ *C02F 1/4693* (2013.01); *B01D 61/44* (2013.01); *B01D 61/46* (2013.01); *B01D 61/50* (2013.01);
(Continued)

(58) Field of Classification Search
CPC .................. C02F 1/4693; C02F 1/4674; C02F 2201/46115; C02F 2101/16; B01D 61/46; B01D 61/44
See application file for complete search history.

(56) References Cited

U.S. PATENT DOCUMENTS 3,732,164 A     5/1973 Pressley et al.
3,929,600 A    12/1975 Hiasa et al.
(Continued)

FOREIGN PATENT DOCUMENTS

WO     WO 98/11987 A1     3/1998
WO     WO 2014/134734 A1  9/2014
(Continued)

OTHER PUBLICATIONS

International Search Report and Written Opinion dated Aug. 16, 2016, issued by the Canadian Intellectual Property Office in Patent Cooperation Treaty Application No. PCT/CA2016/050686, filed Jun. 14, 2016.

*Primary Examiner* — Arun S Phasge
(74) *Attorney, Agent, or Firm* — Klarquist Sparkman, LLP (57) ABSTRACT

Methods, systems, and techniques for removing ammonium from ammonia-containing water involve using a stack that has alternating product chambers and concentrate chambers for receiving ammonia-containing water and an acidic solution, respectively, with the chambers being bounded by alternating cation exchange membranes and proton permselective cation exchange membranes. Ammonium moves from the product chambers to the concentrate chambers across the CEMs and protons move from the concentrate chambers to the product chambers across the pCEMs when the stack is in use. An electrolyzer may also be used to convert the ammonium in the concentrate chambers into nitrogen.

40 Claims, 2 Drawing Sheets

(51) Int. Cl.
  B01D 61/46 (2006.01)
  B01D 61/50 (2006.01)
  C02F 1/467 (2006.01)
  C02F 1/66 (2006.01)
  C02F 1/76 (2006.01)
  C02F 1/04 (2006.01)
  C02F 1/44 (2006.01)
  C02F 1/52 (2006.01)
  C02F 101/16 (2006.01)
  C02F 1/461 (2006.01)
  C02F 103/10 (2006.01)
  C02F 103/26 (2006.01)

(52) U.S. Cl.
  CPC ........ *C02F 1/4674* (2013.01); *B01D 2311/12* (2013.01); *B01D 2311/2634* (2013.01); *B01D 2311/2684* (2013.01); *C02F 1/04* (2013.01); *C02F 1/441* (2013.01); *C02F 1/442* (2013.01); *C02F 1/445* (2013.01); *C02F 1/447* (2013.01); *C02F 1/461* (2013.01); *C02F 1/66* (2013.01); *C02F 1/76* (2013.01); *C02F 2001/5218* (2013.01); *C02F 2101/16* (2013.01); *C02F 2103/10* (2013.01); *C02F 2103/26* (2013.01); *C02F 2201/4613* (2013.01); *C02F 2201/4617* (2013.01); *C02F 2201/4618* (2013.01); *C02F 2201/46115* (2013.01); *C02F 2201/46145* (2013.01); *C02F 2209/003* (2013.01); *C02F 2209/006* (2013.01); *C02F 2209/05* (2013.01); *C02F 2209/06* (2013.01); *C02F 2209/14* (2013.01); *C02F 2209/29* (2013.01); *C02F 2209/40* (2013.01)

(56) References Cited

U.S. PATENT DOCUMENTS

| | | | |
|---|---|---|---|
| 4,268,279 | A | 5/1981 | Shindo et al. |
| 7,160,430 | B2 | 1/2007 | Shelp et al. |
| 8,398,945 | B2 | 3/2013 | Gehrke et al. |
| 10,125,428 | B2 * | 11/2018 | Barak ...................... C25B 7/00 |
| 2008/0128291 | A1 | 6/2008 | Meessen et al. |

FOREIGN PATENT DOCUMENTS

| | | |
|---|---|---|
| WO | WO 2015/024135 A1 | 2/2015 |
| WO | WO 2015/066811 A1 | 5/2015 |
| WO | WO 2015/164744 A1 | 10/2015 |

* cited by examiner

PROCESS AND SYSTEM FOR REMOVING AMMONIUM FROM WASTEWATER

CROSS REFERENCE TO RELATED APPLICATIONS

This is the U.S. National Stage of International Application No. PCT/CA2016/050686, filed Jun. 14, 2016, which was published in English under PCT Article 21(2), which in turn claims the benefit of U.S. Provisional Application No. 62/175,637, filed Jun. 15, 2015. The provisional application is incorporated herein in its entirety.

TECHNICAL FIELD

The present disclosure is directed at processes, systems, and techniques for removing ammonium from wastewater using at least a membrane-based process.

BACKGROUND

Wastewater that contains one or both of ammonia and ammonium ("ammonia-containing water") emits offensive smells and promotes eutrophication, which is fatal to aquatic life. Ammonia-containing water is therefore increasingly being treated before being discharged into the environment. Well-developed processes comprising biological processes, air stripping, resin-based ion exchange, and breakpoint chlorination have been applied to treating ammonia-containing water. While these processes may be suitable for certain applications, they can be non-ideal for other applications as they typically suffer from one or both of relatively low processing efficiencies and relatively high processing costs. Biological processes, for example, typically can efficiently remove ammonia and/or ammonium from ammonia-containing water, but they are not flexible for changing ammonia loadings, their performance is heavily impacted by environmental temperature, and process upsets can kill the organisms driving the biological processes, requiring long downtime to rectify. Air stripping processes release ammonia into the air, creating air pollution; if the ammonia is recaptured, a large amount of base solution must be consumed. Resin-based ion exchange processes require regenerating by chemical means or disposing of ion-exchange resins, which is expensive for large-scale continuous wastewater treatment. Breakpoint chlorination processes are typically only economical when the ammonia and/or ammonium content in water is less than 10 ppm; for higher concentrations, the costs of adding large quantities of chlorine and of removing leftover chlorine before water discharge inhibit large-scale utilization of those processes. In addition, saline waters with varying ammonia loads are being encountered in industry.

SUMMARY

According to a first aspect, there is provided a system for removing ammonium from ammonia-containing water. The system comprises an ammonium-removal stack, and the stack comprises alternating product chambers and concentrate chambers configured to receive the ammonia-containing water and an acidic solution, respectively; and alternating cation exchange membranes ("CEMs") and proton permselective cation exchange membranes ("pCEMs") located between and bounding the product and concentrate chambers. The pCEMs have a proton permeability of more than ten times that of other cations, and the ammonium moves from the product chambers to the concentrate chambers across the CEMs and protons move from the concentrate chambers to the product chambers across the pCEMs when the stack is in use.

The stack may further comprise a first electrode and a second electrode, and the product and concentrate chambers may be located between the first and second electrodes.

The membrane that bounds the chamber nearest to the first electrode and the membrane that bounds the chamber nearest to the second electrode may be pCEMs.

At least one of the membranes that bounds the chamber nearest to the first electrode and that bounds the chamber nearest to the second electrode may be one of the CEMs.

The first and second electrodes may be coupled to a direct current power supply operable in a first polarity in which the first electrode is at a higher potential than the second electrode and at a second polarity in which the second electrode is at a higher potential than the first electrode.

The system may further comprise a chlorine-based oxidizing agent addition subsystem fluidly coupled to the concentrate chambers of the stack and configured to remove the ammonium from the concentrate chambers as nitrogen gas.

The system may further comprise an electrolyzer fluidly coupled to the concentrate chambers of the stack and configured to convert the ammonium from the concentrate chambers into nitrogen gas.

The electrolyzer and the concentrate chambers of the stack may be in two parallel fluid circuits.

The electrolyzer and the concentrate chambers of the stack may be in series in a single fluid circuit.

The system may further comprise a conductivity indicating transducer fluidly coupled to the electrolyzer configured to measure the conductivity of fluid flowing through the electrolyzer.

The system may further comprise a salt addition subsystem fluidly coupled to the electrolyzer and configured to supply chloride compound to the fluid flowing through the electrolyzer.

The system may further comprise a control subsystem communicatively coupled to the conductivity indicating transducer and the salt addition subsystem. The control subsystem may comprise a processor communicatively coupled to a computer readable medium that has stored thereon program code executable by the processor and that, when executed by the processor, causes the processor to monitor, using the conductivity indicating transducer, a concentration of the chloride compound in the fluid flowing through the electrolyzer; and in response to the concentration of the chloride compound as monitored by the conductivity indicating transducer, cause the salt addition subsystem to add the chloride compound to the fluid flowing through the electrolyzer such that the concentration is maintained above a user-defined set point.

The system may further comprise an acid addition subsystem fluidly coupled to the concentrate chambers and configured to provide an acid to the acidic solution.

The system may further comprise a pH monitoring subsystem fluidly coupled to the concentrate chambers and configured to measure pH of the acidic solution.

The system may further comprise a control subsystem communicatively coupled to the acid addition subsystem and the pH monitoring subsystem. The control subsystem may comprise a processor communicatively coupled to a computer readable medium that has stored thereon program code executable by the processor and that, when executed by the processor, causes the processor to monitor, using the pH monitoring subsystem, a pH of the acidic solution; and; in response to the pH of the acidic solution as monitored by the pH monitoring subsystem, cause the acid addition subsystem to add the acid to the acidic solution such that pH of the acidic solution is maintained below 6.0.

The system may further comprise a pH monitoring subsystem fluidly coupled to the product chambers and configured to measure pH of the water entering the product chambers.

The system may further comprise a base addition subsystem fluidly coupled to the product chambers and configured to provide a base to the water entering the product chambers.

The system may further comprise a control subsystem communicatively coupled to the base addition subsystem and the pH monitoring subsystem. The control subsystem may comprise a processor communicatively coupled to a computer readable medium that has stored thereon program code executable by the processor and that, when executed by the processor, causes the processor to monitor, using the pH monitoring subsystem, a pH of the water entering the product chambers; and; in response to the pH of the water entering the product chambers as monitored by the pH monitoring subsystem, cause the base addition subsystem to add the base to the water entering the product chambers such that pH of the water entering the product chambers is maintained above 5.0.

The system may further comprise a secondary water treatment subsystem fluidly coupled to the product chambers and configured to treat product water exiting the product chambers.

The secondary water treatment subsystem may comprise at least one of a reverse osmosis subsystem, forward osmosis subsystem, nanofiltration subsystem, electrodialysis subsystem, thermal desalination subsystem, membrane distillation subsystem, crystallization subsystem, and biological treatment subsystem.

The system may further comprise an NH3-N and/or NH4+-N monitoring subsystem fluidly coupled to the outlet of the product chambers and configured to measure the ammonia and ammonium level of product water exiting the product chambers; a control valve, selectively fluidly coupling the outlets of the product chambers, the inlets of the product chambers, and a system outlet for discharging the product water exiting the product chambers; a control subsystem communicatively coupled to the monitoring subsystem and the control valve, the control subsystem comprising a processor communicatively coupled to a computer readable medium that has stored thereon program code executable by the processor and that, when executed by the processor, causes the processor to (i) obtain the ammonia and ammonium level of the product water from the monitoring subsystem; (ii) compare the ammonia and ammonium level to a user-defined maximum permissible concentration; (iii) when the ammonia and ammonium level is less than or equal to the maximum permissible concentration, actuate the control valve such that the product water exits the system outlet; and (iv) when the ammonia and ammonium level exceeds the maximum permissible concentration, actuate the control valve such that the product water returns to the inlet of the product chambers.

According to another aspect, there is provided a process for removing ammonium from ammonia-containing water. The process comprises flowing the ammonia-containing water and an acidic solution through a stack. The stack comprises alternating product chambers and concentrate chambers, and the ammonia-containing water and the acidic solution flow through the product chambers and the concentrate chambers, respectively; and alternating cation exchange membranes ("CEMs") and proton permselective cation exchange membranes ("pCEMs") located between and bounding the product and concentrate chambers, with the pCEMs having proton permeability of more than ten times that of other cations. The process further comprises causing the ammonium to move from the product chambers to the concentrate chambers across the CEMs and protons to move from the concentrate chambers to the product chambers across the pCEMs.

The stack may further comprise a first and a second electrode, and the product and concentrate chambers may be located between the first and the second electrodes, and wherein the process further comprises applying a voltage across the stack.

The process may further comprise swapping fluids flowing between the product chambers and the concentrate chambers while simultaneously switching polarity of the voltage applying across the stack.

The membrane that bounds the chamber nearest to the first electrode and the membrane that bounds the chamber nearest to the second electrode may be pCEMs.

At least one of the membranes that bounds the chamber nearest to the first electrode and the membrane that bounds the chamber nearest to the second electrode may be one of the CEMs.

The acidic solution may become an acidic ammonium-concentrated solution after receiving the ammonium from the product chambers.

The process may further comprise adding an acid to the acidic ammonium-concentrated solution.

The process may further comprise controlling the acid addition to maintain pH of the acidic ammonium-concentrated solution below pH 6.0.

The process may further comprise removing the ammonium in the acidic ammonium-concentrated solution as nitrogen gas by breakpoint chlorination.

The process may further comprise converting the ammonium in the acidic ammonium-concentrated solution into nitrogen gas by performing electrolysis on the acidic ammonium-concentrated solution.

The electrolysis may be performed by an electrolyzer fluidly coupled to the concentrate chambers.

The process may further comprise monitoring the conductivity of the solution flowing through the electrolyzer.

The process may further comprise adding chloride compound to the solution flowing through the electrolyzer.

The process may further comprise controlling addition of the chloride in response to the monitoring of conductivity of the solution flowing through the electrolyzer such that the conductivity of the solution flowing through the electrolyzer is maintained above a user defined low conductivity set point.

Product water exiting the product chambers may be treated again by feeding the product water exiting the product chambers into the product chambers.

The process may further comprise monitoring the pH of the product water that is being treated again.

The process may further comprise adding a base to the product water that is being treated again.

The process may further comprise controlling addition of the base in response to the monitoring of pH of the product water being treated again such that pH of the product water being treated again is maintained above 5.0.

The process may further comprise further treating product water exiting the product chambers by at least one of reverse osmosis, forward osmosis, nanofiltration, electrodialysis, thermal desalination, membrane distillation, crystallization, and biological treatment.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

The embodiments described herein comprise processes, systems, and techniques for removing ammonium from ammonia-containing water using at least a membrane-based process. More specifically, in the depicted embodiments ammonium in ammonia-containing water is first removed from that water and concentrated in an acidic solution via a membrane-based process; the acidic solution thus becomes an acidic ammonium-concentrated solution by the time it exits the membrane-based process. Compared to a reverse osmosis process, the membrane-based process disclosed herein may tolerate total dissolved solids in the ammonia-containing water in terms of maintaining ammonia-removing efficiency. In some embodiments, the acidic ammonium-concentrate solution is then fed to an electrolysis process, which converts the ammonium into nitrogen gas. The technique hybridizing the membrane-based process and the electrolysis process becomes a total solution for eliminating ammonia and/or ammonium contaminates in wastewater.

In some embodiments, the ammonia-containing water that is fed to the membrane-based process may comprise only ammonium and not ammonia, in which case the ammonium in that water is paired with suitable counter anions such as acetate ions, bicarbonate ions, carbonate ions, hydroxide ions, dihydrogen phosphate ions, hydrogen phosphate ions, and phosphate ions. In these embodiments, protons migrating from the acidic solution react with those counter anions in the ammonia-containing water during the membrane-based process, thus liberating the ammonium in the ammonia-containing water and permitting the ammonium to be removed from the ammonia-containing water and be subsequently concentrated in the acidic solution. An applicable example reaction taking place in the ammonia-containing water is $NH_4HCO_3 + H^+ \rightarrow NH_4^+ + CO_2 + H_2O$.

In other embodiments, the ammonia-containing water that is fed to the membrane-based process may comprise only ammonia and not ammonium. In these embodiments, protons migrating from the acidic solution react with that ammonia in the ammonia-containing water during the membrane-based process, resulting in ammonium that is removed from the ammonia-containing water and subsequently concentrated in the acidic solution.

In still other embodiments, the ammonia-containing water that is fed to the membrane-based process comprises ammonia and ammonium. In these embodiments, the ammonium removed from the ammonia-containing water and subsequently concentrated in the acidic solution results from the protons from the acidic solution reacting with ammonium's counter anions and from those protons reacting with ammonia.

In the depicted embodiments that are discussed in more detail below, unless otherwise mentioned the ammonia-containing water is wastewater that comprises at least one of ammonia and ammonium. Ammonia is converted into ammonium through reacting protons from the acidic solution during the membrane-based process. Consequently, the embodiments below remove the ammonia from the ammonia-containing water, and as part of that process convert the ammonia into ammonium that is subsequently removed from the ammonia-containing water. As described above, other embodiments in which the ammonium is additionally or alternatively generated are possible.

As used herein, a reference to "ammonia and/or ammonium" is a reference to at least one of ammonia and ammonium. Additionally, reference to "includes" and "including" are references to "includes, without limitation" and "including, without limitation", respectively.

Figure 1:
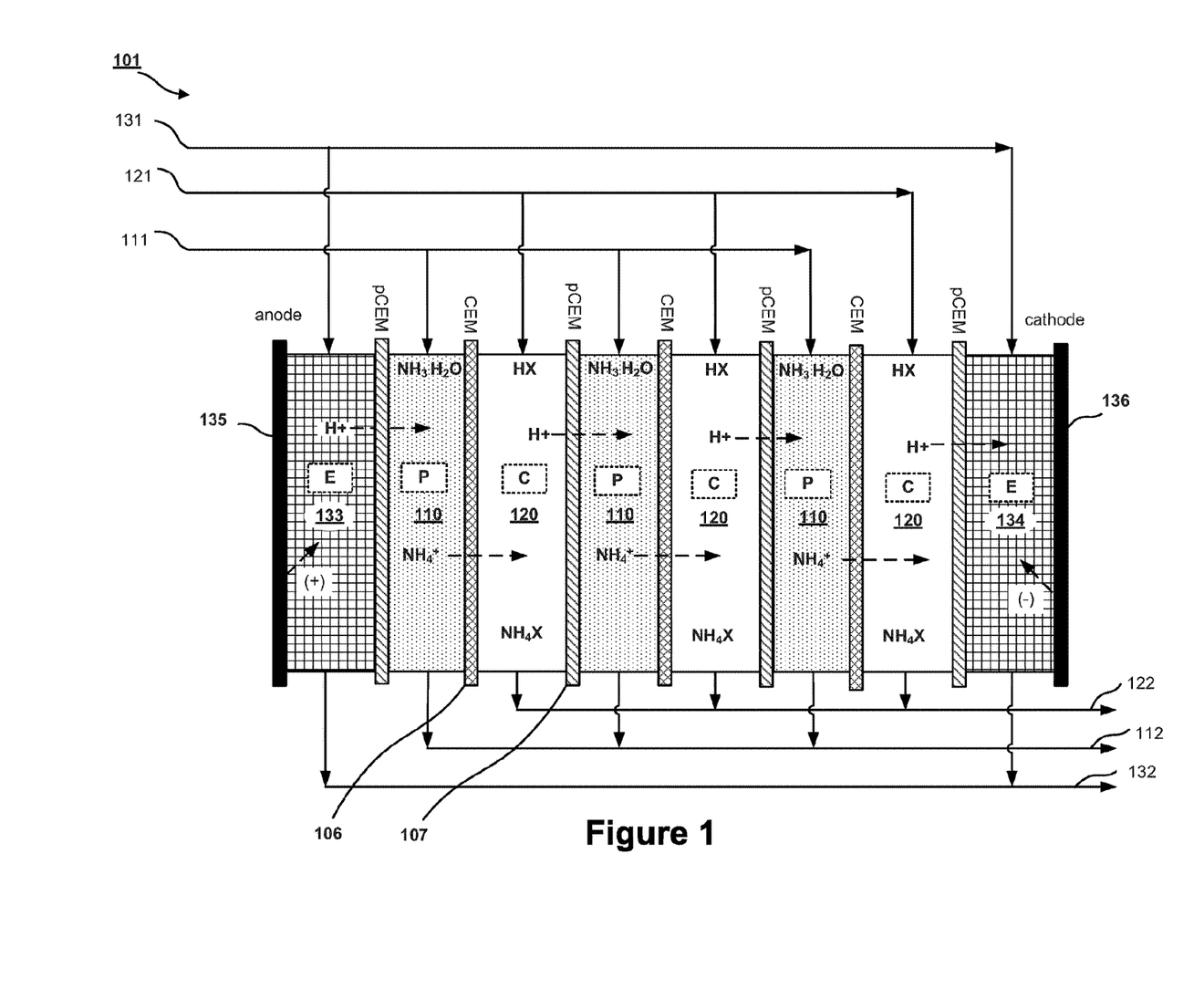
FIG. 1 is a schematic illustrating a membrane-based apparatus for removing and concentrating ammonium from ammonia-containing water, according to one embodiment.

FIG. 1 shows a schematic of an embodiment of a membrane-based apparatus as a membrane stack 101 (this embodiment of the apparatus is hereinafter interchangeably referred to as a "stack 101") for removing ammonium from ammonia-containing water. As illustrated in FIG. 1, two types of ion exchange membranes separate chambers of the stack 101: cation exchange membranes 106 (each a "CEM 106") and proton permselective cation exchange membranes 107 (each a "pCEM 107"). The CEMs 106 are ion exchange membranes substantially permeable to cations and substantially impermeable to, and in some embodiments and depending on operating conditions entirely reject, anions. In some applications, the CEMs 106 may be standard cation exchange membranes permeable to both monovalent and multivalent cations. In alternative applications, the CEMs 106 may be monovalent cation permselective membranes having a permeability ratio of monovalent cations to multivalent cations of above 1.0. The pCEMs 107 are ion exchange membranes substantially permeable to protons over other cations, and are substantially impermeable to, and in some embodiments and depending on operating conditions entirely reject, anions. "Substantially permeable" in the context of the pCEMs 107 refers to the permeation ratio of protons to other cations being greater than 10, preferably being greater than 20, and more preferably being greater than 40. Examples of suitable CEMs 106 include Ionflux™ CEM and mCEM membranes from Saltworks™ Technologies Inc.; and NEOSEPTA CMX™ and CIMS™ membranes from ASTOM™ Corporation. Examples of suitable pCEMs 107 include amphoteric type ion exchange membrane in which negative groups and positive groups exist in a certain ratio and an ion exchange membrane in which membrane surface is modified with a thin positively charged proprietary polymer such as Ionflux™ pCEM membranes from Saltworks™ Technologies Inc.

FIG. 1 shows one embodiment of the stack 101 operating in a forward polarity operating mode. The stack 101 comprises a first electrode 135 and a second electrode 136. The first and second electrodes 135,136 may be coupled to a direct current power supply (not depicted in FIG. 1) operable in a forward polarity to operate the stack 101 in the forward polarity, and also operable in reverse polarity to operate the stack 101 in a reverse polarity as discussed in more detail below. A first electrolyte chamber 133 has one side bounded by the first electrode 135 and a second electrolyte chamber 134 has an opposite side bounded by the second electrode 136; the two electrodes 135,136 bound the ends of the stack 101. A series of alternating first chambers 110 and second chambers 120 extends between the first and second electrolyte chambers 133,134. Each of the chambers 110,120 has an inlet and an outlet to permit fluid to flow between a pair of membranes comprising one of the CEMs 106 and one of the pCEMs 107. Each of the first chambers 110 comprises one of the pCEMs 107 on the side of the chamber 110 nearest the first electrode 135 and one of the CEMs 106 on the side of the chamber 110 nearest the second electrode 136. Each of the second chambers 120 comprises one of the CEMs 106 on the side of the chamber 120 nearest the first electrode 135 and one of the pCEMs 107 on the side of the chamber 120 nearest the second electrode 136. Any two of the chambers 110,120 that neighbor each other share either one of the CEMs 106 or one of the pCEMs 107.

When the stack 101 is in the forward polarity operating mode as shown in FIG. 1, the first electrode 135 acts as an anode and the second electrode 136 acts as a cathode; the first and second electrodes 135,136 are accordingly hereinafter interchangeably referred to as the "anode 135" and "cathode 136" when the stack 101 is in the forward polarity operating mode. Similarly, when the stack 101 is in the forward polarity operating mode, the first electrolyte chamber 133 is hereinafter interchangeably referred to as an "anodic electrolyte chamber" 133 and the second electrolyte chamber 134 is hereinafter interchangeably referred to as a "cathodic electrolyte chamber" 134. Ammonia-containing water is pumped through the first chambers 110 and the ammonia and/or ammonium is at least partially depleted by the time the water exits the first chambers 110; the first chambers 110 are accordingly hereinafter referred to as "product chambers 110" or "P-chambers 110". Additionally, an acidic solution is pumped through the second chambers 120 and carries away ammonium removed from the first chambers 110, thereby turning the acidic solution into the acidic ammonium-concentrated solution upon exiting the second chambers 120; the second chambers 120 are accordingly hereinafter referred to as "concentrate chambers 120" or "C-chambers 120".

Periodically, polarity of the stack 101 may be reversed and the stack 101 may operate in reverse polarity operating mode (not depicted) to clean possible scaling on the ion exchange membranes. When operating in reverse polarity operating mode, the first electrode 135 acts as a cathode and the second electrode 136 acts as an anode; the first and second electrodes 135,136 are accordingly hereinafter interchangeably referred to as the "cathode 135" and "anode 136" when the stack 101 is in the reverse polarity operating mode. Similarly, when the stack 101 is in the reverse polarity operating mode, the first electrolyte chamber 133 is hereinafter interchangeably referred to as a "cathodic electrolyte chamber" 133; the second electrolyte chamber 134 is hereinafter interchangeably referred to as an "anodic electrolyte chamber" 134; ammonia-containing water is pumped through the second chambers 120, and the second chambers 120 are accordingly hereinafter referred to as "product chambers 120" or "P-chambers 120"; and the acidic solution is pumped through the first chambers 110 and carries ammonium removed from the second chambers 120. The first chambers 110 are accordingly hereinafter referred to as "concentrate chambers 110" or "C-chambers 110". Unless otherwise mentioned, the following description refers to the stack 101 in the forward polarity operating mode.

Ammonia-containing water (for example, $NH_3.H_2O$) is supplied to the stack 101 and the inlets of its P-chambers 110 through an input conduit 111; as described in further detail below, the stack 101 removes at least some of the ammonia and/or ammonium from the P-chambers 110 by converting the ammonia into ammonium in the P-chambers 110 and then removing that ammonium from the P-chambers 110, and the fluid that has had at least some of its ammonia and/or ammonium depleted exits an output conduit 112 via the P-chambers 110's outlets. The ammonia-containing water is illustrated as $NH_3.H_2O$ in FIG. 1, but as mentioned above in different embodiments (not depicted) it may be water contaminated by ammonia and/or ammonium. The acidic solution (HX) is supplied to the stack 101 and its C-chambers 120 via an input conduit 121; as the acidic solution flows through the C-chambers 120, it gives protons to and receives ammonium transferred from the P-chambers 110. The acidic solution becomes the acidic ammonium-concentrated solution carrying the removed ammonium and exits an output conduit 122 via the C-chambers 120's outlets. The routing of the contents of the P-chambers 110 and C-chambers 120 may be controlled via suitable valve, conduit, and pump subsystems (not depicted in FIG. 1).

In some embodiments and for some applications, a base may be added to the ammonia-containing water prior to the ammonia-containing water being pumped through the stack 101 to adjust its pH above 5.0, preferably above 7.0, and more preferably above 9.0 to precipitate metal salt ions and to convert ammonium into ammonia.

In the embodiment shown in FIG. 1, the acidic solution is used to remove and concentrate ammonium from the ammonia-containing water. Suitable acids include, for example, acetic acid, hydrochloric acid, sulfuric acid, phosphoric acid, and other acids known to those skilled in the art and their mixtures. In another embodiment, an acid-salt mixture may be used to remove and concentrate ammonium from the ammonia-containing water. The added salt may increase the conductivity of the acidic solution and may improve the efficiency of ammonium removal. Suitable salts include, for example, sodium chloride, sodium sulfate, and other salts known to those skilled in the art and their mixtures.

In some examples, the acid concentration of the acidic solution in the C-chambers 120 may be controlled to remain within a certain pH range using an acid dosing system and acid concentration sensors and to prevent osmosis caused by dramatic acid concentration differences between fluids flowing through the P-chambers 110 and C-chambers 120. Suitable pH ranges include from −1 to 6, preferably from 0 to 3, and more preferably from 0.5 to 2.0.

While the stack 101 is operating, protons ($H^+$) from the acidic solution flowing in the C-chambers 120 cross the pCEMs 107 and migrate into the ammonia-containing water flowing in the P-chambers 110 and react in the P-chambers 110 with ammonia ($NH_3$) to produce ammonium ($NH4^+$). Additionally or alternatively, in embodiments in which the ammonia-containing water also comprises ammonium paired with one or more counter anions (not shown in FIG. 1), protons from the acidic solution flowing in the C-chambers 120 cross the pCEMs 107 and migrate into the ammonia-containing water flowing in the P-chambers 110 and react in the P-chambers 110 with those counter anions that are paired with ammonium to liberate ammonium in the P-chambers 110. Examples of counter anions that may be paired with ammonium in the P-chambers 110 are acetate ions, bicarbonate ions, carbonate ions, hydroxide ions, dihydrogen phosphate ions, hydrogen phosphate ions, and phosphate ions. An applicable example reaction taking place in the P-chambers 110 is $NH_4HCO_3+H^+ \rightarrow NH_4^+ CO_2+H_2O$. Anions $X^-$ in the acidic solution flowing in the C-chambers 120 do not migrate into the P-chambers 110 from the C-chambers 120 by crossing ion exchange membranes, as each of the C-chambers 120 is bounded by a CEM 106 and a pCEM 107. To maintain charge neutralities (electroneutrality) in the P-chambers 110 and C-chambers 120, the produced ammonium $NH_4^+$ migrates from the P-chambers 110 and through the CEMs 106 into the C-chambers 120, and combines there with $X^-$ anions such as acetate, chloride, sulfate, and phosphate, to form ammonium salts. The mobility of ammonium is significantly slower than that of protons in the acidic solution in the C-chambers 120, and the pCEMs 107 have high permselectivity for protons over ammonium. Accordingly, there is substantially no ammonium crossing the pCEMs 107 from the C-chambers 120 into the P-chambers 110, thereby trapping the ammonium in the C-chambers 120 until it exits the C-chambers 120's outlets. As a result, the ammonia and/or ammonium concentration in the ammonia-containing water decreases (and eventually substantially entirely depletes) in the P-chambers 110, the ammonium concentration in the acidic solution increases in the C-chambers 120, and the acidic solution becomes acidic ammonium-concentrated solution by the time the solution exits the C-chambers 120.

As referred to above, for some applications, the operating mode of the stack 101 may be switched from the forward polarity operating mode, as depicted in FIG. 1, to a reverse polarity operating mode in which the ammonia-containing water and the acidic solution are swapped between the chambers 110,120 to switch the migration directions of protons and ammonium and to alleviate the fouling tendency of the membranes in the stack 101.

The driving force that drives protons to migrate across the pCEMs 107 from the acidic solution flowing in the C-chambers 120 into the ammonia-containing water flowing in P-chambers 110 can be from one or both of proton concentration difference (passive diffusion, which is possible without an electric field), and applying an electric field across the stack 101 to increase proton flux across the pCEMs 107. The driving forces for migrating ammonium across the CEMs 106 from the ammonia-containing water flowing in the P-chambers 110 into the acidic solution flowing in the C-chambers 120 can be from one or both of charge neutrality (passive diffusion), and applying an electric field across the stack 101. Driving ion migrations in the stack 101 with an electric field uses more electric energy but uses membrane surface area more efficiently than relying on passive diffusion alone. In the applications that do not comprise applying an electric field to the stack 101, the first and second electrode 135,136, and the first and second electrolyte chambers 133,134 in the stack 101 are optional.

To drive the stack 101 in forward polarity operating mode with an electric field, a direct current power supply (not shown in FIG. 1) applies an electric potential (voltage) across the electrodes 135,136 (in reverse polarity operating mode, the polarity across and functionality of the electrodes 135,136 is reversed). In the embodiment shown in FIG. 1, the electrolyte chambers 133,134, which are hydraulically separated, are on the ends of the stack 101. The anodic electrolyte chamber 133 is adjacent to the P-chamber 110 nearest the anode 135, and is bound on one side by the anode 135 and on the other side by the pCEM 107 that separates the anodic electrolyte chamber 133 from the leftmost P-chamber 110. The cathodic electrolyte chamber 134 is adjacent to the C-chamber 120 nearest the cathode 136, and is bound by on one side by the cathode 136 and on the other side by the pCEM 107 that separates the cathodic electrolyte chamber 134 from the rightmost C-chamber 120. In the embodiment shown in FIG. 1, the pCEMs 107 separate the anodic electrolyte chamber 133 from the P-chamber 110 nearest the anode 135 and the cathodic electrolyte chamber 134 from the C-chamber 120 nearest the cathode 136, ensuring substantially no other ions except protons cross between those electrolyte chambers 133,134 and their adjacent P-chamber 110 and C-chamber 120, respectively. In certain embodiments (not depicted) the direct current power supply is operable to drive the stack 101 in the forward polarity and in the reverse polarity.

In different embodiments (not depicted), one or both of the pCEMs 107 that separate the cathodic electrolyte chamber 134 from the C-chamber 120 nearest the cathode 136 and the anodic electrolyte chamber 133 from the P-chamber 110 nearest the anode 135 may be replaced with one of the CEMs 106. This may be done, for example, if the CEMs 106 have a higher mechanical durability than the pCEMs 107. In some of these different embodiments, the C-chamber 120 and P-chamber 110 nearest the cathode 135 and anode 136, respectively, may comprise a relatively small percentage (e.g., <5%) of the total number of chambers 110,120; any decrease in efficiency resulting from swapping the CEMs 106 for the pCEMs 107 is accordingly relatively minor. In another of these different embodiments, a pure acid solution without salt cations may be used as the electrolyte, thereby obviating the need for the membranes bounding the rightmost C-chamber 120 and the cathodic electrolyte chamber 134 and bounding the leftmost P-chamber 110 and the anodic electrolyte chamber 133 to differentiate between protons and other cations.

An electrolyte solution is contained in an electrolyte tank (not shown) and pumped by an electrolyte pump (not shown) via an electrolyte distribution conduit 131 into the stack 101's electrolyte chambers 133,134. The electrolyte solution flows back into the electrolyte tank in a closed loop process via an electrolyte return conduit 132. Example electrolytes may include sodium chloride solution, sodium sulfate solution, hydrochloric acid, sulfuric acid, and other electrolytes known to those skilled in the art. Alternatively, the electrolyte solution may be the acidic ammonium-concentrated solution exiting the C-chambers 120's outlets, thereby recycling that solution. Using the acidic ammonium-concentrated solution exiting the C-chambers 120 in some embodiments may facilitate at least partial depletion of ammonium directly or indirectly by the electrochemical reactions taking place at the electrodes 135,136 while also simplifying the plant by reducing the need for a separate electrolyte pump, tank, and pipework.

For some applications, the stack 101 may switch between operating in the forward polarity operating mode and the reverse polarity operating mode periodically to switch the migration directions of protons and ammonium and to remove scaling that has built up on membrane surfaces; this may be done, for example, by reversing the polarity of the potential applied to the electrodes 135,136 while simultaneously swapping the fluids pumped into the P-chambers 110 and C-chambers 120.

In some embodiments (not depicted), the P-chambers 110 may be filled or partially filled with ion exchange resins to facilitate ammonium transportation and to enhance the conductivity in the P-chambers 110.

In different embodiments (not depicted), the stack 101 may exclude one or more of the electrolyte chambers 133,134, electrodes 135,136, and related conduits 131,132, and yet retain the P-chambers 110, C-chambers 120, and membranes 106,107. In one of these different embodiments, the ammonia-containing water and the acidic solution are flowing through the P-chambers 110 and C-chambers 120, respectively. Protons passively diffuse from the C-chambers 120 into the P-chambers 110 and ammonium passively migrates from the P-chambers 110 to the C-chambers 120 as described above.

Figure 2:
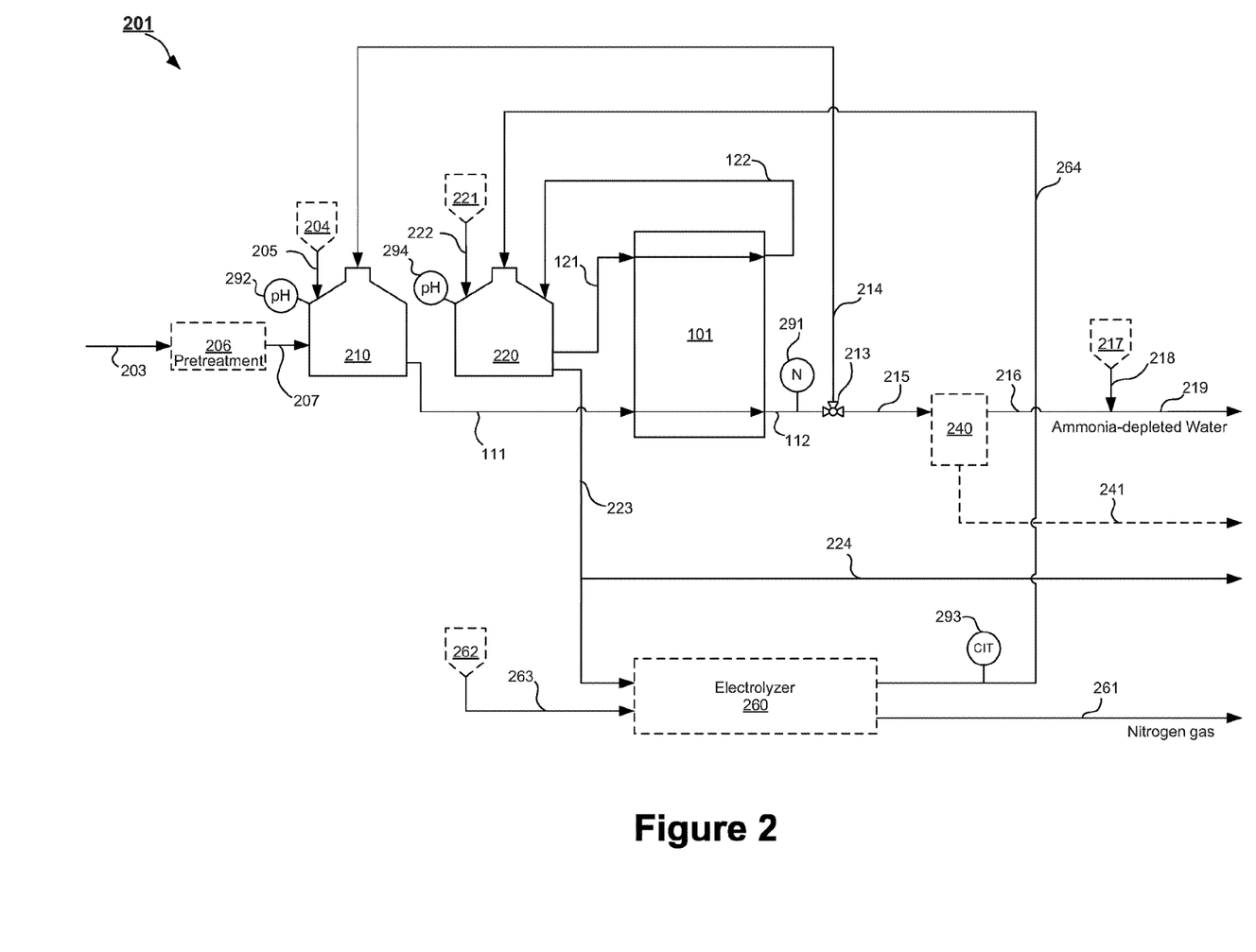
FIG. 2 is a schematic illustrating an ammonium removal system that comprises the membrane-based apparatus illustrated in FIG. 1 to concentrate and remove ammonium from ammonia-containing water and an electrolysis apparatus to convert ammonium into nitrogen gas, according to another embodiment.

FIG. 2 illustrates an ammonia-removal system 201 that depletes ammonium from ammonia-containing water, according to one example embodiment. The system 201 comprises the stack 101 illustrated in FIG. 1. The stack 101 removes and concentrates ammonium from ammonia-containing water containing nitrogen content derived from ammonia and/or ammonium ($NH_3$—N and/or $NH_4^+$—N) in concentrations above 10 ppm flowing through the P-chambers 110. As a result of this treatment, the ammonia and/or ammonium is at least partially depleted from the ammonia-containing water to a degree that satisfies applicable discharge requirements (e.g., nitrogen content derived from ammonia and/or ammonium at a concentration in the treated water of less than 10 ppm) and is consequently ready for discharge from the system 201 (treated water that exits from the P-chambers and has been at least partially depleted of its initial ammonia and/or ammonium content is hereinafter interchangeably referred to as "product water"). In the embodiment of FIG. 2, the system 201 further comprises a storage tank 210 ("ammonia-containing water tank 210"), fluidly coupled to the input conduit 111, for storing ammonia-containing water for feeding to the stack 101, which in FIG. 2 includes ammonia-containing water that has been treated one or more times by the stack 101 but that has not yet had sufficient ammonia and/or ammonium depleted to be ready for discharge from the system 201; a base addition subsystem 204 fluidly coupled to the ammonia-containing water tank 210 and for adding a base to the ammonia-containing water, which includes the feed water and the product water treated one or more times by the stack 101 but still having ammonia and/or ammonium above the discharge limit; a pretreatment subsystem 206 fluidly coupled to the ammonia-containing water tank 210 to pretreat ammonia-containing water as it enters the system 201; a pH adjustment subsystem 217 for adjusting the pH of the product water as it is being discharged from the system 201; a storage tank 220 ("acidic ammonium-concentrated solution tank 220"), fluidly coupled to the input conduit 121 and the output conduit 122, for storing the acidic solution that is fed to the stack 101 and the acidic ammonium-concentrated solution exiting the stack 101; an acid addition subsystem 221 fluidly coupled to the ammonia-containing water tank 210 to add acid thereto; a secondary water treatment subsystem 240, fluidly coupled to receive the product water exiting the stack 101; an electrolyzer 260 fluidly coupled to the stack 101's concentrate chambers for converting ammonium into nitrogen; a salt addition subsystem 262 fluidly coupled to the electrolyzer 260 for supplying a salt or salt-base mixture to the electrolyzer 260; an $NH_3$—N and/or $NH_4^+$—N content monitoring subsystem 291 fluidly coupled to the outlet conduit 112 for detecting the ammonia and/or ammonium level of the product water exiting the P-chambers 110; pH monitoring subsystems 292,294 coupled to the ammonia-containing water tank 210 and the acidic ammonium-concentrated solution tank 220 to monitor the pH therein; and a conductivity indicating transducer (CIT) 293 (for example, conductivity or resistivity transmitters coupled with a conductivity probe) coupled to the electrolyzer 260 to monitor conductivity of the solution output from the electrolyzer 260 to the acidic ammonium-concentrated solution tank 220. While FIG. 2 includes all of the foregoing subsystems, in different embodiments (not depicted), the system 201 may comprise any one or more of these subsystems. In FIG. 2, the electrolyzer 260 and stack 101 are depicted as operating in parallel. In a different embodiment (not depicted), the electrolyzer 260 and the stack 101 may be operated in series. For example, the electrolyzer 260 may be positioned upstream of the stack 101 to treat the acidic ammonium-concentrated solution fed to the stack 101's concentrate chambers in one embodiment, and be positioned downstream of the stack 101 to treat the acidic ammonium-concentrated solution exiting the stack 101's concentrate chambers in another embodiment.

The system 201 may be fluidly coupled upstream or downstream of other wastewater-treatment systems. As shown in FIG. 2, the system 201 operates in a continuous manner; however, in different embodiments (not depicted), the system 201 may be operated in a batch manner by controlling suitable valves, conduits, and pumps.

Ammonia-containing water entering the system 201 is supplied along an input conduit 203 to the pretreatment subsystem 206, then via another input conduit 207 to the ammonia-containing water tank 210. Upon the pH monitoring subsystem 292 (for example, a pH transmitter coupled with a pH probe) detecting pH of the ammonia-containing water, the base addition subsystem 204 (for example, a base solution container coupled with a control valve) may supply via a conduit 205 a base solution to adjust the pH of the ammonia-containing water in the ammonia-containing water tank 210, to precipitate metal salt ions, and to convert ammonium in the ammonia-containing water into ammonia. The pH of the ammonia-containing water in the tank 210 is kept above 5.0, preferably above 7.0, and more preferably above 9.0. In addition, as the stack 101 operates, the pH of the ammonia-containing water in the tank 210 may decrease, reducing the stack 101's ability to remove ammonia and ammonium. The base addition subsystem 204 may also be employed to increase the pH of the solution to be treated one or more times by the stack 101. For example, when the product water exiting the stack 101 does not meet the ammonia and/or ammonium treatment goal as measured by the $NH_3$—N and/or $NH_4^+$—N monitoring subsystem 291 (for example, a colorimetric ammonia/ammonium analyzer) while its pH is below 5.0, this product water is recirculated to the tank 210 and its pH is adjusted there, by adding a base using the base addition subsystem 204, to above 5.0, preferably above 7.0, and more preferably above 9.0. The pH-adjusted product water is then re-fed to the stack 101 for further ammonium removal. Suitable bases include, for example, sodium hydroxide and calcium hydroxide. As mentioned above, while the base addition subsystem 204 is depicted in FIG. 2, in different embodiments (not depicted) the system 201 excludes the base addition subsystem 204.

The ammonia-containing water may comprise, for example, any one or more of raw wastewater from fertilizer production or agricultural sources, municipal wastewater, mine wastewater, and water containing a certain amount of ammonia after having undergone other water treatments. For example, the ammonia-containing water may comprise water that has undergone membrane filtrations (e.g., the water may comprise the permeate stream or the rejected stream of a reverse osmosis or nanofiltration process), the vapor condensate or concentrated brine from a thermal evaporation process, or the dilute stream or the concentrated stream of an electrodialysis process. The pretreatment subsystem 206 may, for example, comprise one or both of settlement and microfiltration to remove suspended solids or precipitates from raw, input wastewater; additionally or alternatively, the pretreatment subsystem 206 may comprise other processes known to those skilled in the art.

While the system 201 is being used to remove ammonia and/or ammonium, at least two solution streams are directed to the stack 101: an ammonia-containing water stream from the ammonia-containing water tank 210 via the input conduit 111, and an acidic solution stream from the acidic ammonium-concentrated solution tank 220 via the input conduit 121. The stack 101 removes ammonia and/or ammonium from the ammonia-containing water and concentrates the ammonium in the acidic solution as described above in respect of FIG. 1. Accordingly, the product water exiting the stack 101 via the output conduit 112 has been at least partially depleted of ammonia and/or ammonium, and the acidic solution exits the stack 101 as the acidic ammonium-concentrated solution. The $NH_3$—N and/or $NH_4^+$—N content monitoring subsystem 291 monitors the $NH_3$—N and/or $NH_4^+$—N of the product water exiting the stack 101's product chambers 110, which is indicative of the concentration of ammonia in the water. Example $NH_3$—N and/or $NH_4^+$—N content monitoring subsystem 291 includes a colorimetric ammonia analyzer, a conductivity sensor and a combination of conductivity and pH sensors. When the $NH_3$—N and/or $NH_4^+$—N level of this product water is less than or equal to a maximum permissible $NH_3$—N and/or $NH_4^+$—N concentration, the system 201 may discharge the product water via a control valve 213 and conduits 112,215, 216,219; the maximum permissible $NH_3$—N and/or $NH_4^+$—N concentration may, for example, correspond to a maximum permissible ammonia and/or ammonium concentration. Alternatively, the product water exiting the stack 101 may be fed via a control valve 213 and conduit 214 back to the ammonia-containing water tank 210 and then recirculated through the stack 101 for further ammonium removal until the $NH_3$—N and/or $NH_4^+$—N concentration of the water is below the maximum $NH_3$—N and/or $NH_4^+$—N discharge limit. Before being discharged from the system 201, the pH of the product water may be adjusted to meet any applicable environmental regulations (for example, a pH range of 6.0 to 8.5). To this end, the pH adjustment subsystem 217 (for example, a base solution container coupled with a control valve) may supply a pH adjustment agent such as sodium hydroxide via a conduit 218 to the product water before it is discharged. The fluid path through which fluid flows from the ammonia-containing water tank 210, through the P-chambers 110 of the stack 101, valve 213, and conduit 214 en route back to the tank 210 is the "ammonia-containing water circuit".

In some embodiments, the stack 101 partially removes ammonium from ammonia-containing water or only removes ammonium from ammonia-containing water without removing other contaminates such as phosphates and biochemical oxygen demand (BOD) that may also have to be removed from the ammonia-containing water before it is discharged to the environment. For example, wastewater from an anaerobic digester centrate usually has a nitrogen content derived from ammonia and/or ammonium above 1,000 ppm, a BOD concentration of about 2,000 ppm, and a phosphate concentration of about 200 ppm. To treat wastewater containing contaminates other than ammonia and/or ammonium, the system 201 may use the secondary water treatment subsystem 240 to treat the product water exiting the stack 101. Example water treatment systems that may serve as the secondary water treatment subsystem 240 include reverse osmosis systems, forward osmosis systems, nanofiltration systems, electrodialysis systems, thermal desalination systems, membrane distillation systems, crystallization systems, and biological treatment systems. In another embodiment (not shown in FIG. 2), one of these secondary water treatment subsystems 240 may be installed upstream of the stack 101 to treat the input wastewater stream prior to the stack 101 (e.g., between the pretreatment subsystem 206 and ammonia-containing water tank 210). During treating the product water exiting the stack 101, the secondary water treatment subsystem 240 outputs a purified water discharged from conduits 216,219, and one of a concentrated salt solution, a solid sludge, and a solid waste discharged through a conduit 241.

The acidic ammonium-concentrated solution exiting the output conduit 122 from the stack 101 carries away concentrated ammonium removed from the ammonia-containing water and is fed back via a control valve 221 and conduit 222 to the tank 220. The fluid path through which fluid flows from the tank 220, the C-chambers 120 of the stack 101, conduit 122, valve 221, and conduit 222 en route back to the tank 220 is the "first concentrate circuit".

In one embodiment, the acidic ammonium-concentrated solution may be recirculated through the stack 101 several times until its ammonium content is concentrated to the highest concentration permissible (e.g., above 10 wt %) under the operating conditions. The final acidic ammonium-concentrated solution generated from the stack 101 and stored in the tank 220 may be discharged via conduits 223,224 directly from the system 201 and recovered for other industrial uses. Alternatively, the final acidic ammonium-concentrated solution may further be treated with breakpoint chlorination, wherein an oxidizing agent addition subsystem (for example, a bleach solution container coupled with a control valve and a chlorine sensor, not depicted) supplies chlorine-based oxidizing agents comprising one or more of $Cl_2$ (g), $Cl_2$ (aq), sodium hypochlorite and hypochlorous acid (HOCl) to the solution to remove its ammonium as nitrogen gas before discharge.

While the stack 101 is used to remove ammonia and/or ammonium, the pH monitoring subsystem 294 (for example, a pH transmitter coupled with a pH probe) monitors the pH of the solution in the tank 220. The acid addition subsystem 221 (for example, an acid solution container coupled with a control valve) supplies via the conduit 222 an acid or an acid-salt mixture to the tank 220 to maintain the pH of the solution in the tank 220 below 6.0, preferably below 4.0, and more preferably below 2.0. A suitable acid may be, for example, acetic acid, hydrochloric acid, sulfuric acid, phosphoric acid, and their mixtures. A suitable salt may be, for example, sodium chloride, sodium sulfate, and their mixtures.

In another embodiment, the acidic ammonium-concentrated solution may be fed from the tank 220 via a conduit 223 to the electrolyzer 260, where ammonium is electrochemically oxidized into nitrogen gas. The nitrogen gas is then discharged from the system 201 via a conduit 261. The process and mechanism of converting ammonium into nitrogen gas through an electrolysis process are disclosed in U.S. Pat. Nos. 3,732,164, 3,929,600, 7,160,430, and 8,398,945, the entireties of which are hereby incorporated by reference herein. The indirect ammonium oxidation process is described by electrolytic reactions including the following:

Cathode:

Anode:

and $$Cl_2 + H_2O \rightarrow HOCl + HCl$$

$$2NH_4^+ + 3HOCl \rightarrow N_2 + 3H_2O + 5H^+ + 3Cl^-.$$

During the electrolysis process, the CIT 293 monitors the conductivity (in a different and non-depicted embodiment, an oxidation-reduction potential sensor may be used alternatively to monitor the oxidation-reduction potential) of the solution exiting the electrolyzer 260. The salt addition subsystem 262 (for example, a salt solution container coupled with a control valve) may supply via a conduit 263 one or both of a base and a chloride compound to the electrolyzer 260 to maintain one or both of (1) chloride ion to $NH_3$—N(or $NH_4^+$—N) mole ratio of at least 3.0 and (2) pH of concentrated ammonium solution therein in the range of 0.5 to 10.0, preferably within the range of 1.0 to 8.0, and more preferably within the range of 2.0 to 7.0. Suitable bases include, for example, sodium hydroxide, potassium hydroxide, calcium hydroxide, and their mixtures. Chloride compounds, which are electrolyzed into chlorine, facilitate the oxidation of ammonium into nitrogen gas. Suitable chloride compounds includes sodium chloride, potassium chloride, calcium chloride, and their mixtures.

The ammonium oxidation process reduces ammonium content while simultaneously generating an acid, which may be useful in facilitating ammonia and/or ammonium removal by the stack 101. Completely or partially ammonium-depleted solution exiting the electrolyzer 260 may contain excess oxidizing agents hypochlorous acid (HOCl) and chlorine ($Cl_2$) generated in the electrolyzer 260. To facilitate efficient use of these oxidizing agents, the solution exiting the electrolyzer 260 may be fed back to the tank 220 where the excess oxidizing agents (HOCl and $Cl_2$) react with ammonium as described above. The acid generated from the ammonium oxidation process is also fed back to the tank 220 and stack 101 to remove and concentrate ammonium from the ammonia-containing water. The fluid path through which fluid flows from the tank 220, the electrolyzer 260, and conduits 264,227 en route back to the tank 220 is the "second concentrate circuit".

In FIG. 2, the electrolyzer 260 and stack 101 are depicted as operating in parallel and the acidic ammonium-concentrated solutions are fed in parallel to the first concentrate circuit comprising the stack 101's concentrate chambers 120 and the second concentrate circuit comprising the electrolyzer 260. In a different embodiment (not depicted), the electrolyzer 260 and the stack 101 may be operated in series; for example, the electrolyzer 260 may be positioned in the first concentrate circuit comprising the stack 101's concentrate chambers 120 upstream of the stack 101 in one embodiment and downstream of the stack 101 in another embodiment.

As described above, hydrogen gas is generated during the cathode reaction as a byproduct of the electrolysis process. In some applications, a hydrogen fuel cell or combustion burner (not shown in FIG. 2) may be coupled with the system 201 to provide a use for hydrogen gas that would otherwise be discarded.

In some embodiments (not depicted in FIG. 2), it may be beneficial for cost efficiency purposes to use a control subsystem to control and/or regulate operations of the stack 101 and electrolyzer 260. In one embodiment, the control subsystem comprises a controller (e.g., a programmable logic controller (PLC)) that is communicatively coupled to various sensors and valves comprising part of the system 201. The controller comprises a processor communicatively coupled to a non-transitory computer readable medium, with the medium having stored thereon program code that, when executed by the processor, causes the processor to communicate with components in the system 201 to control and/or regulate operation of the system 201. Operation of the system 201 may be controlled manually, automatically by the controller, or a combination of manually and automatically.

In one example embodiment, the controller controls the point at which the polarity and the flows of the stack 101's chambers are reversed. This may be triggered by a pre-programmed condition based on, for example, time or the stack 101's electrical resistance set points.

In another example embodiment, based on the pH set points (for example, pH 5.0 as a low set point, pH 12.0 as a high set point) for the fluid in the tank 210, the controller receives a signal from the pH monitoring subsystem 292 and then activates the base addition subsystem 204 to add a certain amount of base to the fluid in the tank 210 when its pH is at or below pH 5.0 until the measured pH is at a stopping set point that is between the low and high set points.

In another example embodiment, when the pH monitoring subsystem 294 detects the pH of the solution in the tank 220 increases to a user-defined high set point, for example pH 6.0, the subsystem 294 signals the controller to activate the acid addition subsystem 221 to add a certain amount of acid to the solution in the tank 220 until its pH decreases to a stopping set point, for example pH −1.0.

In another example embodiment, the CIT 293 monitors the conductivity of the solution exiting the electrolyzer 260 and sends signals to the controller, which activates the salt addition subsystem 262 to add a certain amount of chloride compound such as sodium chloride to the solution in electrolyzer 260 when the CIT 293 detects the conductivity of the solution exiting the electrolyzer 260 reaches a user defined low conductivity set point. For example, the salt addition subsystem 260 may add an amount of chloride compound sufficient to increase the conductivity of the solution to a stopping set point that is above the low conductivity set point.

In another embodiment, when the $NH_3$—N and/or $NH_4^+$—N content monitoring subsystem 291 detects the $NH_3$—N and/or $NH_4^+$—N content in the product water exiting the stack 101 to be above the discharge limit, it may signal the controller to activate the control valve 213 to recirculate the product water to the tank 210 instead of discharging it in the conduit 215. The controller also monitors and controls the final $NH_3$—N and/or $NH_4^+$—N level in the product water so that it matches, within an acceptance threshold, any applicable $NH_3$—N and/or $NH_4^+$—N discharge limit to prevent excess recirculation of the product water to the ammonia-containing water tank 210 and to provide precise discharge and recirculation control as the concentration of $NH_3$—N and/or $NH_4^+$—N in the product water nears the discharge limit.

In another embodiment, the final $NH_3$—N and/or $NH_4^+$—N level in the product water exiting the stack 101 is controlled by increasing the power applied to the electrolyzer 260. Increasing the power, and more specifically increasing the current density, applied to the electrolyzer 260 increases the rate of chlorine generation and the rate of ammonium destruction. High rates of chlorine generation and ammonium destruction facilitate decreases in ammonium levels in the acidic ammonium-concentrated solution while also increasing acid (proton) generation through the ammonium oxidation process. A low ammonium concentration and a high proton concentration in the acidic ammonium-concentrated solution flowing in the conduit 121 and stack 101's chambers 120 helps drive ammonium removal in the stack 101.

In another example embodiment (not depicted), any one or more of the above controlling processes may be applied simultaneously through the control subsystem to facilitate ammonium depletion in the product water.

While using the ammonia-removal system 201 to deplete ammonia from ammonia-containing water, one or both of commercially available acids and bases may be used for pH adjustment and control. Alternatively or additionally, these acids and bases may be produced through a bipolar membrane electrodialysis ("BPMED") process, which converts aqueous salt solution into an acid and base without the addition of other chemicals. The BPMED process and mechanism of generating an acid and base are disclosed in U.S. Pat. No. 2,829,095, the entirety of which is hereby incorporated by reference herein.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A system for removing ammonium from ammonia-containing water, the system comprising an ammonium-removal stack, the stack comprising:
   (a) alternating product chambers and concentrate chambers configured to receive the ammonia-containing water and an acidic solution, respectively; and
   (b) alternating cation exchange membranes ("CEMs") and proton permselective cation exchange membranes ("pCEMs") located between and bounding the product and concentrate chambers, wherein the pCEMs have a proton permeability of more than ten times that of other cations,
      wherein the ammonium moves from the product chambers to the concentrate chambers across the CEMs and protons move from the concentrate chambers to the product chambers across the pCEMs when the stack is in use.

2. The system of claim 1 wherein the stack further comprises a first electrode and a second electrode, wherein the product and concentrate chambers are located between the first and second electrodes.

3. The system of claim 2 wherein the membrane that bounds the chamber nearest to the first electrode and the membrane that bounds the chamber nearest to the second electrode are pCEMs.

4. The system of claim 2 wherein at least one of the membranes that bounds the chamber nearest to the first electrode and that bounds the chamber nearest to the second electrode is one of the CEMs.

5. The system of claim 2 wherein the first and second electrodes are coupled to a direct current power supply operable in a first polarity in which the first electrode is at a higher potential than the second electrode and at a second polarity in which the second electrode is at a higher potential than the first electrode.

6. The system of claim 1 further comprising a chlorine-based oxidizing agent addition subsystem fluidly coupled to the concentrate chambers of the stack and configured to remove the ammonium from the concentrate chambers as nitrogen gas.

7. The system of claim 1 further comprising an electrolyzer fluidly coupled to the concentrate chambers of the stack and configured to convert the ammonium from the concentrate chambers into nitrogen gas.

8. The system of claim 7 wherein the electrolyzer and the concentrate chambers of the stack are in two parallel fluid circuits.

9. The system of claim 7 wherein the electrolyzer and the concentrate chambers of the stack are in series in a single fluid circuit.

10. The system of claim 7 further comprising a conductivity indicating transducer fluidly coupled to the electrolyzer configured to measure the conductivity of fluid flowing through the electrolyzer.

11. The system of claim 10 further comprising a salt addition subsystem fluidly coupled to the electrolyzer and configured to supply chloride compound to the fluid flowing through the electrolyzer.

12. The system of claim 11 further comprising a control subsystem communicatively coupled to the conductivity indicating transducer and the salt addition subsystem, wherein the control subsystem comprises a processor communicatively coupled to a computer readable medium that has stored thereon program code executable by the processor and that, when executed by the processor, causes the processor to:
   (a) monitor, using the conductivity indicating transducer, a concentration of the chloride compound in the fluid flowing through the electrolyzer; and
   (b) in response to the concentration of the chloride compound as monitored by the conductivity indicating transducer, cause the salt addition subsystem to add the chloride compound to the fluid flowing through the electrolyzer such that the concentration is maintained above a user-defined set point.

13. The system of claim 1 further comprising an acid addition subsystem fluidly coupled to the concentrate chambers and configured to provide an acid to the acidic solution.

14. The system of claim 13 further comprising a pH monitoring subsystem fluidly coupled to the concentrate chambers and configured to measure pH of the acidic solution.

15. The system of claim 14 further comprising a control subsystem communicatively coupled to the acid addition subsystem and the pH monitoring subsystem, wherein the control subsystem comprises a processor communicatively coupled to a computer readable medium that has stored thereon program code executable by the processor and that, when executed by the processor, causes the processor to:
   (a) monitor, using the pH monitoring subsystem, a pH of the acidic solution; and;
   (b) in response to the pH of the acidic solution as monitored by the pH monitoring subsystem, cause the acid addition subsystem to add the acid to the acidic solution such that pH of the acidic solution is maintained below 6.0.

16. The system of claim 1 further comprising a pH monitoring subsystem fluidly coupled to the product chambers and configured to measure pH of the water entering the product chambers.

17. The system of claim 16 further comprising a base addition subsystem fluidly coupled to the product chambers and configured to provide a base to the water entering the product chambers.

18. The system of claim 17 further comprising a control subsystem communicatively coupled to the base addition subsystem and the pH monitoring subsystem, wherein the control subsystem comprises a processor communicatively coupled to a computer readable medium that has stored thereon program code executable by the processor and that, when executed by the processor, causes the processor to:
(a) monitor, using the pH monitoring subsystem, a pH of the water entering the product chambers; and
(b) in response to the pH of the water entering the product chambers as monitored by the pH monitoring subsystem, cause the base addition subsystem to add the base to the water entering the product chambers such that pH of the water entering the product chambers is maintained above 5.0.

19. The system of claim 1 further comprising a secondary water treatment subsystem fluidly coupled to the product chambers and configured to treat product water exiting the product chambers.

20. The system of claim 19 wherein the secondary water treatment subsystem comprises at least one of a reverse osmosis subsystem, forward osmosis subsystem, nanofiltration subsystem, electrodialysis subsystem, thermal desalination subsystem, membrane distillation subsystem, crystallization subsystem, and biological treatment subsystem.

21. The system of claim 1 further comprising:
(a) an $NH_3$—N and/or $NH_4^+$—N content monitoring subsystem fluidly coupled to the outlet of the product chambers and configured to measure the ammonia and/or ammonium level of product water exiting the product chambers;
(b) a control valve, selectively fluidly coupling the outlets of the product chambers, the inlets of the product chambers, and a system outlet for discharging the product water exiting the product chambers;
(c) a control subsystem communicatively coupled to the monitoring subsystem and the control valve, the control subsystem comprising a processor communicatively coupled to a computer readable medium that has stored thereon program code executable by the processor and that, when executed by the processor, causes the processor to:
(i) obtain the ammonia and/or ammonium level of the product water from the monitoring subsystem;
(ii) compare the ammonia and/or ammonium level to a user-defined maximum permissible concentration;
(iii) when the ammonia and/or ammonium level is less than or equal to the maximum permissible concentration, actuate the control valve such that the product water exits the system outlet; and
(iv) when the ammonia and/or ammonium level exceeds the maximum permissible concentration, actuate the control valve such that the product water returns to the inlet of the product chambers.

22. A process for removing ammonium from ammonia-containing water, the process comprising:
(a) flowing the ammonia-containing water and an acidic solution through a stack, wherein the stack comprises:
(i) alternating product chambers and concentrate chambers, wherein the ammonia-containing water and the acidic solution flow through the product chambers and the concentrate chambers, respectively; and
(ii) alternating cation exchange membranes ("CEMs") and proton permselective cation exchange membranes ("pCEMs") located between and bounding the product and concentrate chambers, wherein the pCEMs have proton permeability of more than ten times that of other cations; and
(b) causing the ammonium to move from the product chambers to the concentrate chambers across the CEMs and protons to move from the concentrate chambers to the product chambers across the pCEMs.

23. The process of claim 22 wherein the stack further comprises a first and a second electrode, wherein the product and concentrate chambers are located between the first and the second electrodes, and wherein the process further comprises applying a voltage across the stack.

24. The process of claim 23 further comprising swapping fluids flowing between the product chambers and the concentrate chambers while simultaneously switching polarity of the voltage applying across the stack.

25. The process of claim 24 wherein the membrane that bounds the chamber nearest to the first electrode and the membrane that bounds the chamber nearest to the second electrode are pCEMs.

26. The process of claim 24 wherein at least one of the membranes that bounds the chamber nearest to the first electrode and the membrane that bounds the chamber nearest to the second electrode is one of the CEMs.

27. The process of claim 22 wherein the acidic solution becomes an acidic ammonium-concentrated solution after receiving the ammonium from the product chambers.

28. The process of claim 27 further comprising adding an acid to the acidic ammonium-concentrated solution.

29. The process of claim 28 further comprising controlling the acid addition to maintain pH of the acidic ammonium-concentrated solution below pH 6.0.

30. The process of claim 27 further comprising removing the ammonium in the acidic ammonium-concentrated solution as nitrogen gas by breakpoint chlorination.

31. The process of claim 27 further comprising converting the ammonium in the acidic ammonium-concentrated solution into nitrogen gas by performing electrolysis on the acidic ammonium-concentrated solution.

32. The process of claim 31 wherein the electrolysis is performed by an electrolyzer fluidly coupled to the concentrate chambers.

33. The process of claim 32 further comprising monitoring the conductivity of the solution flowing through the electrolyzer.

34. The process of claim 33 further comprising adding chloride compound to the solution flowing through the electrolyzer.

35. The process of claim 34 further comprising controlling addition of the chloride in response to the monitoring of conductivity of the solution flowing through the electrolyzer such that the conductivity of the solution flowing through the electrolyzer is maintained above a user defined low conductivity set point.

36. The process of claim 22 wherein product water exiting the product chambers is treated again by feeding the product water exiting the product chambers into the product chambers.

37. The process of claim 36 further comprising monitoring the pH of the product water that is being treated again.

38. The process of claim 37 further comprising adding a base to the product water that is being treated again.

39. The process of claim 38 further comprising controlling addition of the base in response to the monitoring of pH of the product water being treated again such that pH of the product water being treated again is maintained above 5.0.

40. The process of claim 22 further comprising further treating product water exiting the product chambers by at least one of reverse osmosis, forward osmosis, nanofiltration, electrodialysis, thermal desalination, membrane distillation, crystallization, and biological treatment.

* * * * *